(12) United States Patent
Jeong et al.

(10) Patent No.: US 10,216,773 B2
(45) Date of Patent: Feb. 26, 2019

(54) APPARATUS AND METHOD FOR TUNING RELATIONAL DATABASE

(71) Applicant: SYSBANK CO., LTD., Shinjuku-ku, Tokyo (JP)

(72) Inventors: Junyeong Jeong, Tokyo (JP); Kyudong Lee, Tokyo (JP)

(73) Assignee: SYSBANK CO., LTD., Tokyo (JP)

( * ) Notice: Subject to any disclaimer, the term of this patent is extended or adjusted under 35 U.S.C. 154(b) by 0 days.

(21) Appl. No.: 15/317,815

(22) PCT Filed: May 19, 2016

(86) PCT No.: PCT/JP2016/002458
§ 371 (c)(1),
(2) Date: Dec. 9, 2016

(87) PCT Pub. No.: WO2017/183065
PCT Pub. Date: Oct. 26, 2017

(65) Prior Publication Data
US 2019/0034463 A1    Jan. 31, 2019

(30) Foreign Application Priority Data

Apr. 19, 2016 (JP) .................................. 2016-083544

(51) Int. Cl.
*G06F 17/30* (2006.01)
(52) U.S. Cl.
CPC .. *G06F 17/30306* (2013.01); *G06F 17/30002* (2013.01); *G06F 17/30595* (2013.01)
(58) Field of Classification Search
CPC ..................... G06F 17/30306; G06F 17/30595
See application file for complete search history.

(56) References Cited

U.S. PATENT DOCUMENTS

| 2002/0010701 A1* | 1/2002 | Kosciuszko | ...... G06F 17/30312 |
| 2006/0212429 A1* | 9/2006 | Bruno | ............... G06F 17/30463 |

(Continued)

FOREIGN PATENT DOCUMENTS

| JP | 9-34759 A | 2/1997 |
| JP | 10-111819 A | 4/1998 |

(Continued)

*Primary Examiner* — Hosain T Alam
*Assistant Examiner* — Anthony G Gemignani
(74) *Attorney, Agent, or Firm* — Ohlandt, Greeley, Ruggiero & Perle, L.L.P.

(57) ABSTRACT

A tuning apparatus and a tuning method are provided, which make it possible to provide higher-accuracy searching tuning, while still reducing work load for the tuning executed every query language used to operate the relational database, and provide optimum indexes considering effect of the performance of commands not being processed for the tuning. Commands issued using query languages such as SQL are aggregated as acquisition patterns each consisting of search condition information and search method information which are for acquiring search results of data from a relational database. Predetermined execution information provided when the issued commands are executed is made to correspond to the acquisition patterns, thereby providing tuning information to each of the acquisition patterns. Based on the tuning information to each of the acquisition patterns, a tuning table is generated for each of objects which compose the relational database, thereby physically reducing the number of targets being analyzed for the tuning.

14 Claims, 9 Drawing Sheets

(56) References Cited

U.S. PATENT DOCUMENTS

2011/0191312 A1* 8/2011 Gutlapalli ............... G06F 17/30
707/706
2012/0143847 A1* 6/2012 Seo ................... G06F 17/30501
707/718

FOREIGN PATENT DOCUMENTS

| JP | 2001-175678 A | 6/2001 |
| JP | 2003-505766 A | 2/2003 |
| JP | 2008-204141 A | 9/2008 |
| JP | 2012-128522 A | 7/2012 |
| JP | 2012-524930 A | 10/2012 |

* cited by examiner

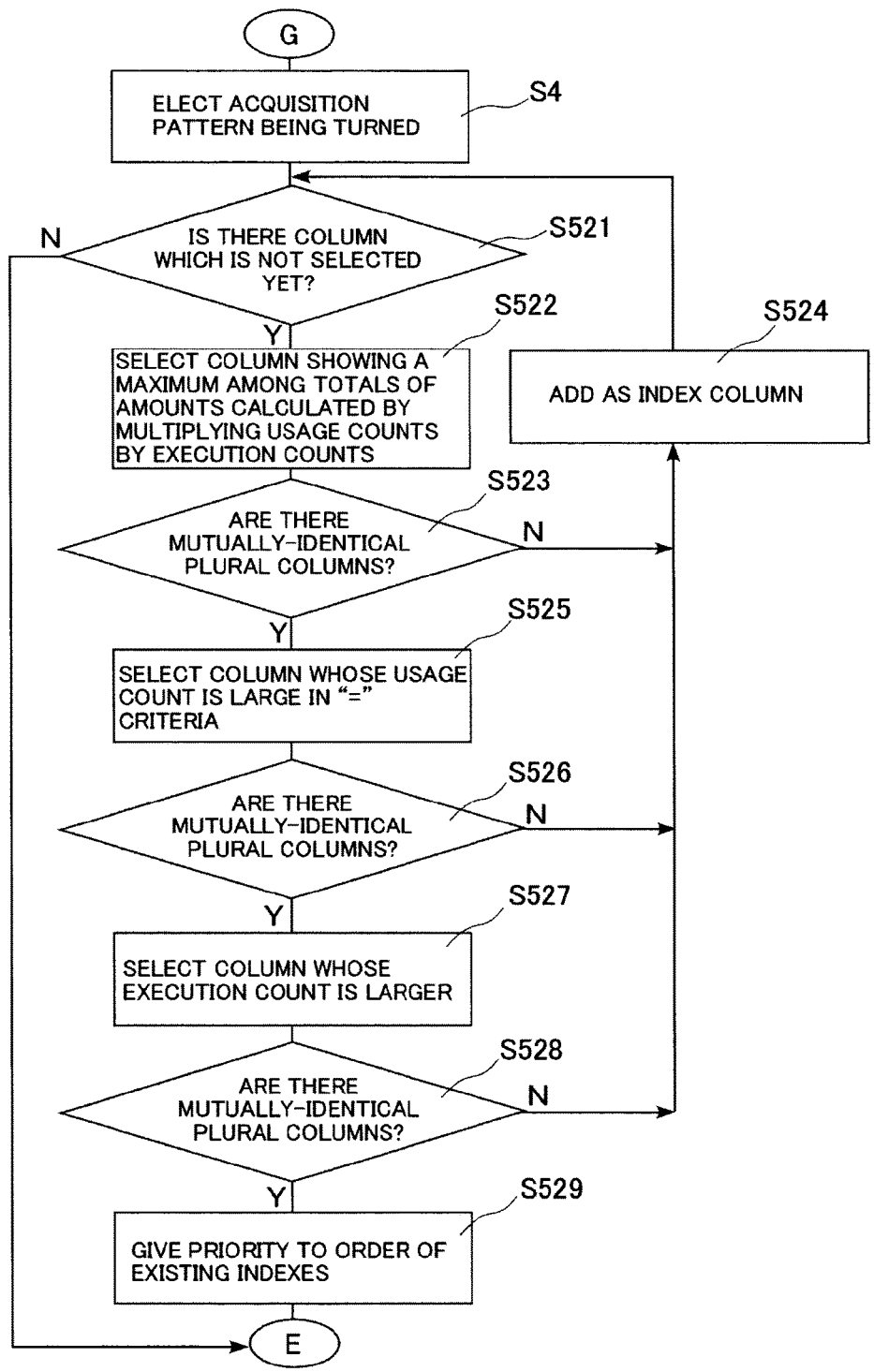

Fig.6

| TABLE | ORDER | ACQUISITION PATTERN | | EVALUATED POINT | NUMBER OF SQLs | EXECUTION COUNT | LAPSE TIME (μs) | CPU TIME (μs) | STANDBY TIME (μs) | NUMBER OF BLOCKS |
|---|---|---|---|---|---|---|---|---|---|---|
| | | SEARCH CONDITION INFORMATION | SEARCH METHOD INFORMATION | | | | | | | |
| tb01(47) | 1 | (TEMPO_CODE=)(YMD=) | tb01_index01 INDEX RANGE SCAN | 33 | 3,093 | 6,150 | 40,475,946,210 | 18,439,210 | 14,433,863,459 | 114,235,134 |
| tb02(156) | 2 | (TEMPO_CODE=) | tb01_index01 INDEX RANGE SCAN | 100 | 312 | 1,134 | 189,166,198 | 728,033 | 145,738,903 | 2,457,433 |
| tb03(2) | 3 | (IDX=)(YMD=) | tb01_index02 INDEX RANGE SCAN | 33 | 525 | 1,044 | 1,170,463,896 | 392,007 | 752,192,008 | 1,371,834 |
| tb04(1) | 4 | (YMD=) | tb01_index03 INDEX RANGE SCAN | 100 | 308 | 1,338 | 17,229,966,768 | 33,797,980 | 13,750,537,335 | 153,941,478 |
| tb05(6) | 5 | (YMD=) | tb01 TABLE ACCESS FULL | 0 | 150 | 178 | 1,876,440,237 | 83,738 | 1,717,630 | 6,373,355 |
| ... | ... | ... | ... | ... | ... | ... | ... | ... | ... | ... |

Fig.7

```
PLAN_TABLE_OUTPUT( Plan hash value: 104517279 )          P1       P2        P

| ID | OPERATION                       | NAME         | CARD | COST |
|  0 | SELECT                          |              |    1 |   77 |
|  1 |                                 |              |    1 |   77 |
|  . |                                 |              |      |      |
|  . |                                 |              |      |      |
|  6 | TABLE ACCESS BY INDEX ROWID     | TB01         |    1 |   74 |
|  7 | INDEX RANGE SCAN                | tb01_index01 | 3292 |   12 |
|  . |                                 |              |      |      |
|  . |                                 |              |      |      |
| 13 | INDEX UNIQUE SCAN               | PKxxxxx      |    1 |    0 |

Predicate Information (from Gathering Information):

6 - filter(("TB01"."YMF"=201007' AND "TB01"."YMD"=TO_CHAR(LAST_DAY(TO_DATE("TB01"."YMF"||'01','yyyymmdd')),'yyyymmdd')))
7 - access("TB01"."TENPO_CODE"='0000001939')
```

P4                                                    P3

| ORDER | INDEX NAME | USAGE COUNT | COLUMN 1 | COLUMN 2 | ... | NUMBER OF SQLs | EXECUTION COUNT | LAPSE TIME (μs) | CPU TIME (μs) | STANDBY TIME (μs) | NUMBER OF BLOCKS |
|---|---|---|---|---|---|---|---|---|---|---|---|
| 1 | tb01_index01 | 5 | TEMPO_CODE | | ... | 3,412 | 40,802,660,725 | 18,297,329 | 14,663,580,396 | 118,660,306 |
| 2 | tb01_index02 | 29 | IDX | | ... | 5,069 | 2,463,096 | 94,628,438,298 | 7,506,501,085 | 55,476,960,519 | 834,522,079 |
| 3 | tb01_index03 | 21 | YMD | TEMPO_CODE | ... | 3,020 | 7,404 | 42,465,781,877 | 110,597,484 | 35,025,639,175 | 588,294,202 |

T211, T212, T213, T214, T215, T216, T217, T218, T219, T220, T221, T222, T2

APPARATUS AND METHOD FOR TUNING RELATIONAL DATABASE

TECHNICAL FIELD

The present invention relates to an apparatus and method for tuning a relational database, and in particular, an apparatus and method for analyzing and improving performance of a relational database.

BACKGROUND ART

There have been provided various types of databases, and in such databases, a database called a relational database is currently most common. Performance of this relational database can be upgraded by reducing a response time to cumulatively increasing amounts of data and/or the number of users. The upgraded performance has an influence on quality of its overall performance, thereby being an important subject in business.

To upgrade the performance of a relational database, many tuning apparatuses and methods have been proposed for analyzing and/or improving the performance (hereinafter, in the description, the term "tuning" is defined as a scheme to analyze and/or improve the performance of the relational database). A relatively simple tuning scheme is, for example, to improve hardware resources by mounting sophisticated CPUs and/or increasing a memory capacity or to optimize database objects. However, this tuning scheme cannot provide an effective improvement in cases where a large number of accesses are generated inefficiently and thus a large amount of useless data is present in cache memory due, to that fact that proper indexes are not applied to access to a large-scale table. With this consideration, as a tuning scheme which improves effectively the performance, tuning a query language has become mainstream.

The query language is, here, a language used for operation of the relational database, such as creation or deletion of databases or registration or search of information, and a typical example is SQL (Structured Query Language). In the present specification, the query language will be hereinafter explained, by way of example, by SQL as long as there is no specific definition.

By the way, when databases are smaller in their sizes and the tuning of the databases are carried out for every SQL command, differences of skill levels of administrators do not tend to appear clearly in the tuning achievements. However, if the database is large-scale, the technique of analyzing the database for each SQL command is dependent on individual skills which require considerable experience. In addition, even if the administrator is well experienced, searching a SQL command which has caused a bottleneck is a large amount of load on the administrator, and this search is not efficient.

Moreover, in the tuning performed with each SQL command, it becomes necessary to optimally add an index to a searched SQL command which has caused the bottleneck. This addition of the index is also dependent on the administrator's skills, thus it is difficult to expect consistent improvement in the tuning.

To solve the foregoing problem concerning the analysis performed every SQL command, there is proposed a database tuning apparatus (for example, refer to PTL1). In this apparatus, for instance, statistical information of SQL commands executed on the database is collectively displayed for each transaction so that the utilization status of each SQL command can be analyzed every transaction. The configurations of this apparatus make it possible to remove SQL-overlapped parts, distribute a SQL command whose usage frequency is extremely high, into a group of other SQL commands, interchange the orders of the SQL commands, and execute other processes, resulting in relatively easier tuning operations compared with the analysis technique performed for every SQL command.

Further, another system is provided as an automatic generation and addition system for indexes (refer to PTL2). In this system, operating information of all issued SQL commands is acquired as information showing change history, and based on the stored operating information, a total execution time is obtained by collecting an execution time for each of the same type of SQL commands whose process contents are consistent with each other. A new index is then added to columns which are objects of SQL commands included in an upper half group of the total execution times, and concurrently, these processes are repeated until an accumulated amount of the total execution time for each SQL command becomes a minimum value. According to this configuration, regardless of factors including individual skills of system administrators, optimum indexes can be generated and added automatically such that there is brought a balance between efficiencies of search and update under a designated trial condition, improving a total operating efficiency of the RDB.

CITATION LIST

Patent Literature

[PTL 1] JP 2001-175678 A
[PTL 2] JP H10-111819 A

SUMMARY OF INVENTION

Technical Problem

However, in the conventional technique according to the foregoing PTL1, the SQLs are aggregated every transaction, thus resulting in limited update processes performed with use of SQLs consisting of INSERT, UPDATE and DELETE. There is therefore problem that the tuning cannot be performed using a process which is the most important in the search steps.

Meanwhile, in the conventional technique according to the foregoing PTL2, there is no sort of consideration about an effect caused in a case where an index automatically generated and added to a column whose assigned object being processed is a predetermined SQL command used in other SQL commands. In this case, the generation and addition of the new index adversely affect the performance.

The present invention is to overcome the forgoing problems, and it is an object of the present invention to provide a tuning apparatus and a tuning method, which make it possible to provide higher-accuracy search tuning, while still reducing operator workload for the tuning executed every query language used for operating the relational database, and provide optimum indexes considering the effect of the performance of commands not being processed by the tuning.

Solution to Problem

In order to realize the foregoing object, the tuning apparatus according to the present invention is characterized in that the apparatus has main features, with which commands issued using query languages such as SQL are aggregated as acquisition patterns each consisting of search condition information and search method information which are for acquiring search results of data from a relational database, predetermined execution information provided when the issued commands are executed is made to correspond to the acquisition patterns, thereby providing tuning information to each of the acquisition patterns, and based on the tuning information to each of the acquisition patterns, a tuning table is generated for each of objects which compose the relational database, thereby physically reducing the number of targets being analyzed for the tuning.

Practically a tuning apparatus according to the present invention is a tuning apparatus which analyzes and improves performance of a relational database, characterized in that the apparatus comprises: acquiring means for acquiring predetermined execution information provided when all commands issued via a predetermined query language to the relational database are executed by a database management system; extracting means for extracting as a pair of acquisition patterns search condition information and search method information for acquiring searched results of data by executing the respective commands; and generating means for generating a tuning table in which the respective executed acquisition patterns are grouped as acquisition pattern groups which are grouped for each of objects of the relational database and each of the acquisition patterns and the acquired execution information corresponding to each of the acquisition patterns are composed as a sequence of tuning information.

According to this configuration, an analysis for the tuning in a query language can be conducted for each of the objects which are aggregated as acquisition patterns, in place of individual analyses of data in each query language.

At least, each of the acquisition patterns may be an acquisition pattern extracted from execution plan information generated by the database management system.

The search condition information may be specified by both column data for narrowing down a target to be searched and operator data given by describing search condition in relation to the column data in a form of the query language, and the search method information may be specified by both index data which are set to the column data for narrowing down the target and scan formula data showing a search path which is set to the object.

The execution information acquired by the acquiring means can include, in addition to the execution plan information, execution record information consisting of, at least, the number of commands of the query language for making reference to objects targeted to each of the acquisition patterns, an execution count, a lapse time of processing, a usage time of a CPU, and a waiting time of the CPU.

The acquiring means may acquire the execution information from a virtual table at regular intervals during an operation of the relational database, and manage the acquired execution information in a time sequence, the virtual table being different from the objects actually stored in the relational database and updated at intervals.

The acquiring means can be configured to acquire the execution record information by two types of data acquisition consisting of acquisition of data accumulated from start of an operation of the relational database and acquisition of data within a designated period of time after the start of the operation of the relational database, the data within the designated period of time being obtained by making predetermined calculating means calculate the accumulated data acquired.

The apparatus can comprises calculating means for calculating, as a score, an access efficiency of the search method information to the search condition information of each of the acquisition patterns based on a predetermined calculation formula, wherein the generating means include information about each of the calculated scores into the execution information.

The generating means may comprise electing means which identify, from the acquisition patterns of the respective objects, an acquisition pattern being turned based on the execution information; and selecting means which read, from the elected acquisition pattern, column data which has not been selected as the index data and select the index data from the read column data according to a predetermined condition, wherein the generating means incorporate the selected index data into the tuning table.

The selecting means may have, at least, two types of selection criteria consisting off a first criterion and a second criterion provided from the execution record information, the first criterion being a preferential selection criterion defined as a usage count of column data which have not been selected, the second criterion, the second criterion being a preferential selection criteria defined as an execution count; and the generating means is capable of selecting, from the tuning table, index data selected based on the two types of selection criteria.

The generating means can be configured to display a number made to correspond to the identified acquisition pattern for display, the number being the number of index data which are the same as index data of the acquisition pattern identified the electing means and which are set in any of the acquisition pattern groups.

The apparatus can be configured to comprise ID adding means for adding to a text an ID to identify the file, the text describing instructions or a command to a query optimizer added to one or more command groups issued for a specific purpose, the text being not changed automatically even after executing the command, wherein the generating means enables the acquisition pattern in the file identified by the added ID, to be browsed.

As another mode, there is provided a tuning method which analyzes and improves performance of a relational database, characterized in that the method includes steps of:

acquiring predetermined execution information provided when all commands issued via a predetermined query language to the relational database are executed by a database management system;

extracting as a pair of acquisition patterns both search condition information and search method information for acquiring searched results of data by executing the respective commands, wherein the search condition information is specified by both column data for narrowing down a target to be searched and operator data given by describing search condition in relation to the column data in a form of the query language, and the search method information is specified by both index data which are set to the column data for narrowing down the target and scan formula data showing a search path which is set to the object; and generating a tuning table in which the respective executed acquisition patterns are grouped as acquisition pattern groups which are grouped for each of objects of the relational database and each of the acquisition patterns and the acquired execution information corresponding to each of the acquisition patterns are composed as a sequence of items of tuning information, wherein the acquisition is performed by acquiring the execution information from a virtual table at regular intervals during an operation of the relational database and stores the acquired execution information in a dedicated repository, and managing the acquired execution information in a time sequence, the virtual table being different from the objects actually stored in the relational database and updated at intervals.

According to this configuration, instead of individually analyzing the database in response to tuning based on each query language, an analysis for the tuning can be performed for each object provided as a collection of acquisition patterns. Concurrently, instead of directly acquiring object data of a relation database which are targets for the analysis, the data can be obtained into a repository from data dictionaries of the targets.

The foregoing tuning method may include a step of calculating, as a score, an access efficiency of the search method information to the search condition information of each of the acquisition patterns based on a predetermined calculation formula, wherein information about each of the calculated scores is included into the execution information.

The tuning method may include, as another example, a step of electing which identifies, from the acquisition patterns of the respective objects, an acquisition pattern being turned based on the execution information; and a step of selecting which reads, from the elected acquisition pattern, column data which has not been selected as the index data and selects the index data from the read column data according to a predetermined condition, wherein the selected index data are incorporated into the tuning table.

Another modification is that, in a plurality of stages for testing performed in designing the object, performing in sequence acquisition of the execution information and extraction of the acquisition patterns, resolving, every column data, search condition information of the extracted acquisition pattern, and generating, in addition to the tuning table, a table in which the usage count counted in the search is sorted in a descending order thereof.

Still another modification is that, in an operation of the relational database in a production environment thereof, when there occur events including registration of new data, deletion of data, or changes of definition of data, identifying an acquisition pattern newly generated, based on a difference between the two tuning tables provided before and after of an occurrence of any of the events.

Still another modification is that, instead of acquiring the execution information at intervals from the virtual table, directly acquiring the execution information from the relational database, during which search is simulated with the relational database through the selected index data, and a data distribution based on the execution information provided before and after application of the selected index is available for browsing.

Advantageous Effects of Invention

In the tuning apparatus and tuning method according to the present invention, the acquisition patterns are extracted, which makes it possible to execute the tuning for each object, not for each query language such as SQL. Hence, items which should be analyzed can be reduced largely in the number and volume, thereby reducing a load for the tuning work.

In addition, extracting the acquisition patterns makes it possible to easily comprehend both the search condition information and the search method information in relation to each of the objects of which quicker comprehension is considered to be difficult in the case of analyses carried out every query language. Therefore, the tuning for search can be conducted in an easier manner.

There is also an advantage that optimum indexes can be represented in view of affection to performance of commands which are not targeted for the tuning.

BRIEF DESCRIPTION OF DRAWINGS

FIG. 5 is a flowchart showing selection of an index for obtaining a second criterion;

FIG. 6 is a table exemplifying the tuning;

FIG. 7 is a view showing SQL execution plan information in the order 1 of an acquisition pattern shown in FIG. 6;

DESCRIPTION OF EMBODIMENTS

Figure 1:
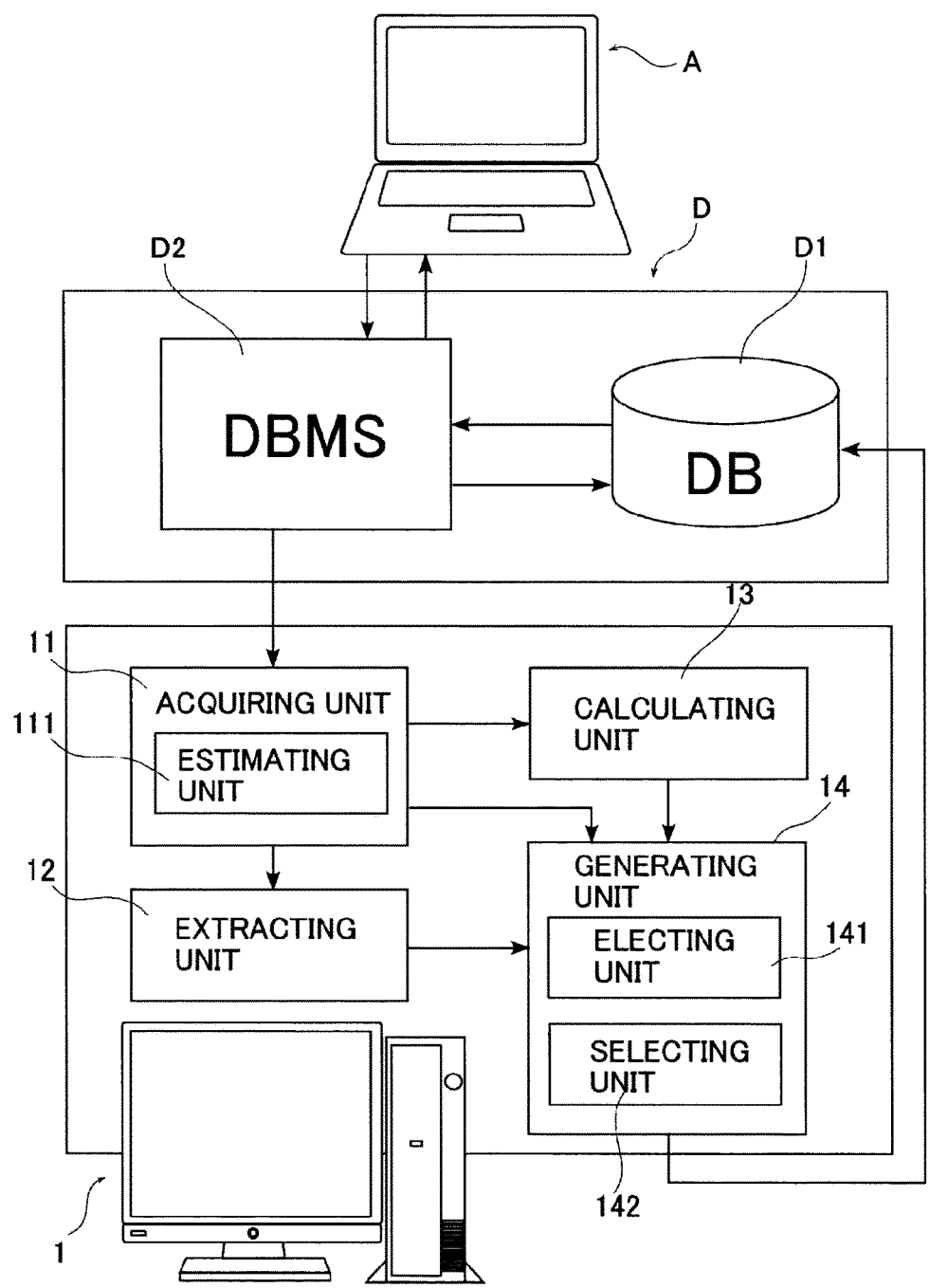
FIG. 1 is a block diagram showing the configuration of a tuning apparatus according to the present invention.

With reference to FIG. 1, reference number 1 shows a tuning apparatus according to the present invention. The tuning apparatus 1 can be implemented as a dedicated apparatus which provides various functions detailed later, and, preferably, practiced as a personal computer which includes, as main components, a central processing apparatus (CPU), a main memory, and a magnetic disk, and other peripheral devices. In this configuration, the CPU mainly controls operations of the respective components of the tuning apparatus 1 according to the present invention. The main memory stores therein control programs executed by the CPU and provides a work area used when the CPU executes the programs. The magnetic disk stores therein various applications including programs for an operating system, drivers of periphery devices, and programs for executing various types of processes according to the present invention. In FIG. 1, there are descriptions only for functions which are necessary for describing functions for the present invention, and various universally-used functions are omitted from being described.

In the present embodiment, the tuning apparatus 1 is connected to a relational database system D, and the relational database system D is connected to a user terminal A. The relational database system D includes a database main unit D1 and a database management system D2. The database main unit D1 is provided with variety of types of tables stored therein (hereinafter, such tables are referred to as "objects" in the embodiment unless there is another definition). Meanwhile the database management system D2 extracts data in response to a browse request for specific data from the user terminal A and monitors data so that access from a plurality of users will not cause discrepancies in the data. In this way the data management system D2 manages and operates the data base main unit D1. The user terminal A is loaded with database applications such as business programs and, using such applications, issues SQL commands to the database management system D2. Responsively to this issuance, the database management system D2 analyzes and rewrites the commands to generate a group of commands for processing instructions, and makes up an execution plan in order to execute efficient processing procedures. The execution plan (which may be a plan whose program data have been already been stored in the cache) enables the SQLs to be executed, resulting in providing objects desired by the users as search targets. Moreover, the database management system D2 also generates information including execution information and statistic information about the executed SQLs. The execution information, which is referred here, includes the foregoing execution plan information, generated as above, as well as information obtained by execution of the SQLs, which is an execution record information including the number of SQLs, an execution count, a lapse time of an execution process, a usage time of the CPU, and a standby time In the present embodiment, the tuning apparatus 1, the relational database system D and the user terminal A are composed of mutually separated hardware units and communicably connected to each other. However, the embodiment will not be limited to this separate hardware configuration. For example, the relational database system D and the user terminal A may be provided by a single hardware unit or the user terminal A and the tuning apparatus 1 may be provided by a single hardware unit. That is, provided that the functions set forth in the specification are provided, the hardware configuration will be confined to that shown in FIG. 1.

The tuning apparatus 1 is provided with an acquiring unit which acquires the foregoing execution information from the database management system D2. The acquiring unit 11 has a dedicated repository for the tuning according to the present invention, where the foregoing execution information is stored in this repository. Origins from which the acquiring unit 11 acquires the execution information are objects stored actually in the database main unit D1 as well as virtual tables consecutively updated during the operation of the database main unit D1. In general, the relational database provides a virtual table (hereinafter, referred to as a view) used for browsing, which is for reducing data redundancy. In the embodiment, the acquiring unit 11 acquires dynamic views (hereinafter, referred to as dynamic performance views) of an operating database at regular intervals.

Figure 2:
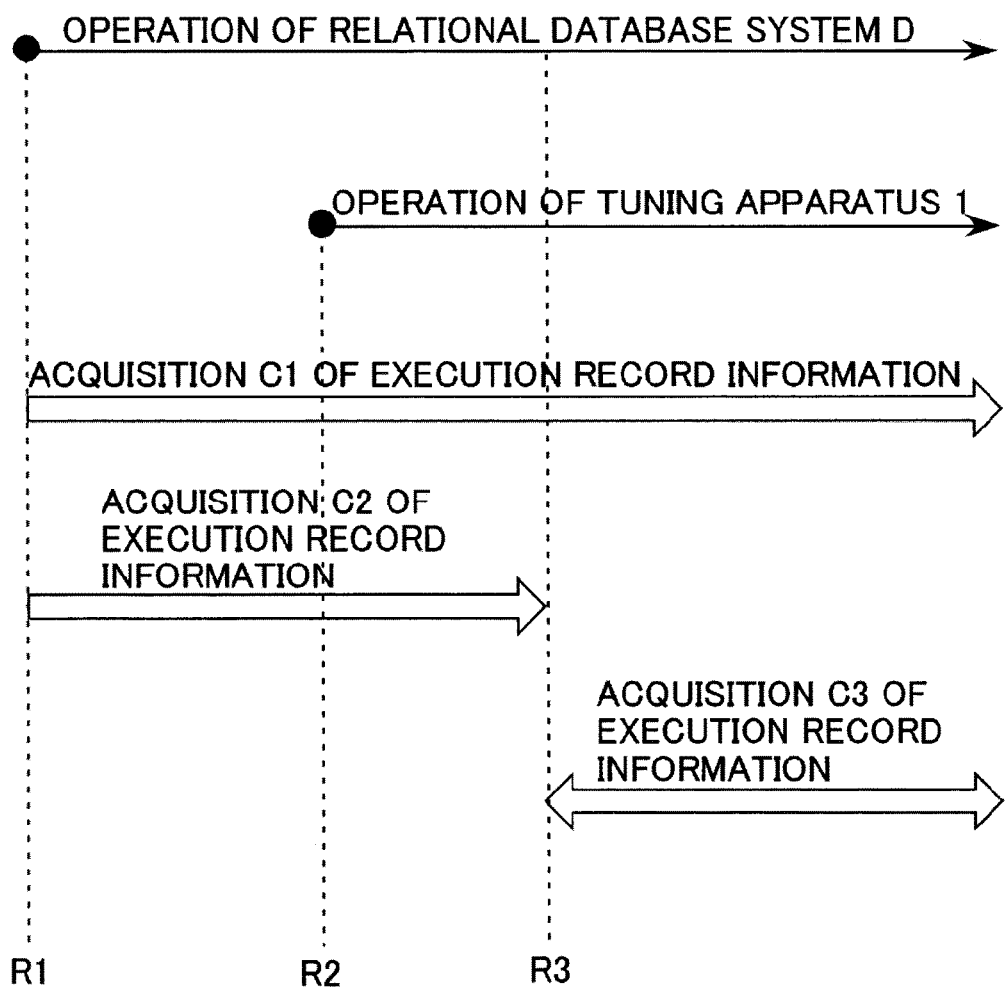
FIG. 2 is a line map showing functions for calculating periods during which performance result information is acquired from the tuning apparatus according to the present invention.

Moreover, the accruing unit 11 has two types of acquiring functions in terms of timing of acquiring the execution record information. One type of function is to acquire total data accumulated from start of operation of the relational database system D and the other is to acquire data in a designated period of time after the operation start of the relational database system D in which an estimating unit 111 obtains such data from the acquired accumulated data. This timing scheme is illustrated in FIG. 2, where the operation start of the relational database D is given by a time point R1 and the operation start of the tuning apparatus 1 is given by a time point R2. In this case, the accumulated data from the operation start time point R1 are composed of data acquired by events C1 and C2 of the execution record information, while, based on a difference of data between the acquisition events C1 and C2 which is estimated by the estimating unit 111, the data acquired from a specific time point R3 are data by an event C3 of the execution record information acquired from the time point R3.

The operation start time point R2 of the tuning apparatus 1 is not directly related to acquisition timing of the execution record information. This is because, at the time point R2, the acquisition actions C1 and C2 of the execution record information includes execution record information which has been generated by the database management system D2 since the operation start time point R1 of the relation database system D.

As explained, the acquiring unit 11 acquires the execution information from the dynamic performance views. In addition, the acquiring unit 11 is capable of selecting from the two types of acquisition timing schemes one acquisition timing scheme of the execution record information, which makes it possible that necessary data are acquired timely depending on tuning purposes.

The extracting unit 12 extracts, as a pair of acquisition patterns, both search condition information and search method information necessary for obtaining searched results of data by executing SQLs, from execution plan information acquired by the acquiring unit 11. As will be detailed with FIG. 6, the search condition information is defined by both column data for narrowing down search targets and operator data provided by describing the search condition s to the column data with use of SQLs. Meanwhile, the search method information is defined by both index data which are set for the column data for narrowing down the search targets and scan formula data showing a search path which is set for the objects.

In general, there is a case where the relational database is searched for desired data whose amount of data is small. In this case, if large amounts of data are all searched in the database, access efficiency to the database will be greatly reduced. Therefore, it is usual to set an index so that the access efficiency increases, but even this measure is confronted with a difficulty in a case where an index which is advantageous for executing a particular SQL is set. In this case, however, there is a probability of lowering the access efficiency in performing other SQLs. Furthermore, there is an alternative technique to access a particular object. In a usual case where many objects are present, different conditional expressions are set, for every search request, for the objects, so that the number of SQLs which are used is very large. Hence, searching for obstructive factors against higher-efficiency access results in a large workload.

With consideration of such circumstances, the tuning apparatus 1 according to the present invention employs a pair of acquisition patterns consisting of the search condition information and the search method information, which have been described. Such a pair of acquisition patterns serve as information to analyze where should be improved for faster access. As will be described later, executed SQL commands are reconstructed into a form of acquisition patterns from a viewpoint of ensuring higher access efficiency, whereby the number of targets being analyzed can be reduced physically and portions at which an obstruction occurs can be found out accurately.

In addition, in the present embodiment, in the form of showing one of the functions of the tuning apparatus 1, there is provided a calculating unit 13 which rates the access efficiency with use of a predetermined calculation formula. For example, when the number of items obtained by executing an SQL is one, there is a remarkable difference in access efficiency between one case and 100 cases both are the number of access cases necessary for reaching the data by executing a plan. There are a wide variety of types and modes of calculation methods for the access efficiency, while in the present embodiment, the calculating unit 13 is configured to calculate scores based on the pair of acquisition patterns, which is as follows:

A preset score of 100 points is given to each search condition information, an average value of each column composing each search condition information is calculated, the average value is multiplied by an adjustment coefficient depending on the function (role) of each column, and the sum of multiplication values is calculated and given as a score to the acquisition patterns. The adjustment coefficient referred in the embodiment is set depending on the role of the column such that, when the role is to access using an index, the foregoing average value is kept (the adjustment coefficient=1), when the role is filtering of an index, half of the foregoing average is given (the adjustment coefficient=½), and when the role is filtering of a table, a score is set at zero (the adjustment coefficient=0).

By way of example, when the search condition information in a particular acquisition pattern is composed of three columns X, Y and Z where X shows index access, Y shows index filtering, and Z shows table filtering, the score of the particular acquisition pattern is decided using the following formula.

$$\frac{100}{3} \cdot 1 + \frac{100}{3} \cdot \frac{1}{2} + \frac{100}{3} \cdot 0 = 50.0 \qquad \text{[formula 1]}$$

However, the formula will not be limited to the foregoing, as long as the access efficiency can be calculated qualitatively based on information obtained from the acquisition patterns. Additionally, the adjustment coefficients may also be modified such that the adjustment coefficients are more segmentalized in accordance with types of scan methods for the search method information.

Based on the execution information acquired by the acquiring unit 11, the acquisition patterns extracted by the extracting unit 12, and the scores calculated by the calculating unit 13, a generating unit 14 generates a tuning table. The tuning table is provided such that the respective acquisition patterns extracted by the extracting unit 12 are grouped into acquisition pattern groups in which the acquisition patterns are grouped object by object and there is provided a sequence of pieces of tuning information consisting of the respective acquisition patterns, the execution information acquired by the acquiring unit 11 corresponding to each of the acquisition patterns, and the scores calculated by the calculating unit 13. The tuning table makes it possible to have a look at the acquisition pattern for each object, and to determine easily which acquisition pattern has lower-ranked access efficiency. Though being detailed later, the number of acquisition pattern groups is narrowed down to a number much smaller than the number of SQLs, as also clear from the extraction steps for the foregoing acquisition patterns. It is therefore possible to discover points which lower the access efficiency in a shorter time, and to reduce a load for tuning work.

The generating unit 14 is provided with an electing unit 141 and a selecting unit 142, where the electing unit 141 elects an acquisition pattern from the acquisition pattern group for each of the objects based on the execution information. The elected acquisition pattern is a target being tuned. Meanwhile, the selecting unit 142 reads, from the elected acquisition patterns, column data which are not elected as index data, and selects index data from the read column data according to a predetermined condition. As detailed with FIG. 8, the selected index data can be included in the tuning table.

Figure 3:
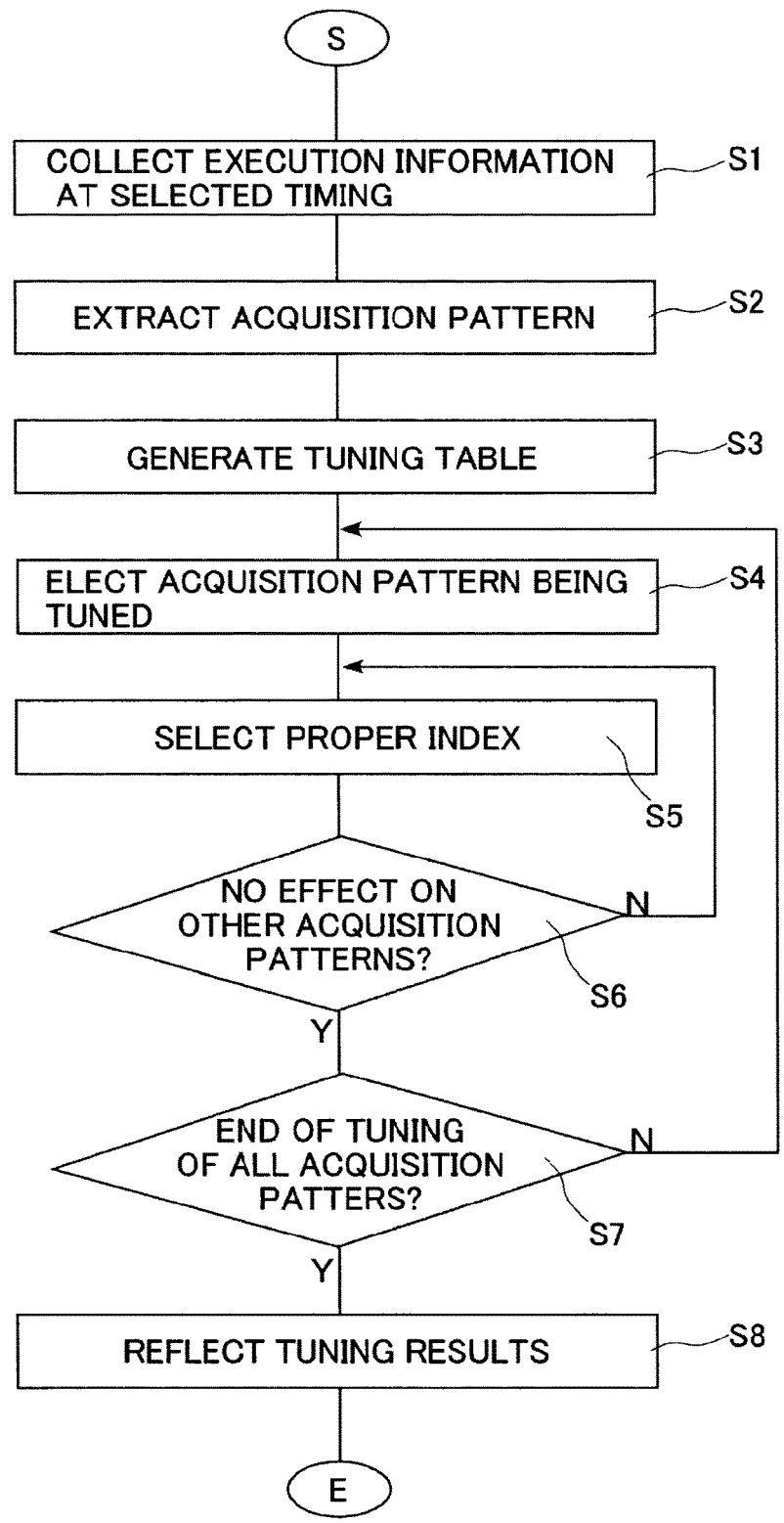
FIG. 3 is a flowchart showing a tuning method according to the present invention.

FIG. 3 is a flowchart showing processes for the tuning method according to the present invention. Hereinafter, together with the tuning apparatus 1 shown in FIG. 1, the tuning method will now be described.

The tuning apparatus 1 connected to the relational database system D is made to be activated. Then, in the tuning apparatus 1, the acquisition timing shown in FIG. 2 is selected at which the acquiring unit starts its acquisition, so that execution information is acquired by the acquiring unit 11 at the selected timing (S1). In this situation, an origin from which the execution information is acquired is not objects stored in the database main unit D1, but objects displayed as dynamic performance views. This acquisition is repeated at regular intervals.

The extracting unit 12 extracts a pair of acquisition patterns from the acquired execution information (S2), where the pair of acquisition patterns is composed of search condition information and search method information. At this stage, the calculating unit 13 may calculate, as a score, an access efficiency of the search method information in relation to the search condition information in each of the extracted acquisition patterns using a predetermined formula (not shown).

Based on the acquired execution information, extracted acquisition patterns, and the calculated score, the generating unit 14 generates a tuning table (S3).

In the generated tuning table, the respective acquisition patterns extracted by the extracting unit 12 are grouped as acquisition pattern groups which are grouped every object, and the execution information acquired by the acquiring unit 11 based on each of the respective acquisition patterns and provided to correspond to each of the acquisitions patterns, and the rank calculated by the calculating unit 13 are formed as a sequence of pieces of tuning information. In addition, from the acquisition pattern groups for each of the objects, an acquisition pattern targeted to be tuned is determined and elected based on the execution information (S4).

From the elected acquisition pattern, column data which are not elected as index data are read, and optimum index data are elected from the column data in accordance with a predetermined condition.

It is then determined whether or not the elected index data affect an access efficiency of other acquisition patterns (S6). When the elected index data affect the access efficiency (No at S6), the processing proceeds to step S5 where an optimum index is elected again. In contrast, when is determined there no such affection (Yes at S6), it is then confirmed whether or not the tuning of all the acquisition patterns have been finished (S7). When being not finished (No at S7), an acquisition pattern being tuned is elected at step S4 again. In contrast, when all the acquisition patterns have already been tuned (Yes at S7), the tuning results are made to be reflected in the relational database D (S8), before ending the tuning.

Incidentally, in the present embodiment, as to the index elected at step S5 in FIG. 3, there are set two types of election criteria consisting of a first criterion and a second criterion. The first criterion is defined as a preferential selection criterion which is a usage count of the non-selected column data, while the second criterion is defined as a preferential selection criterion of an execution count.

Figure 4:
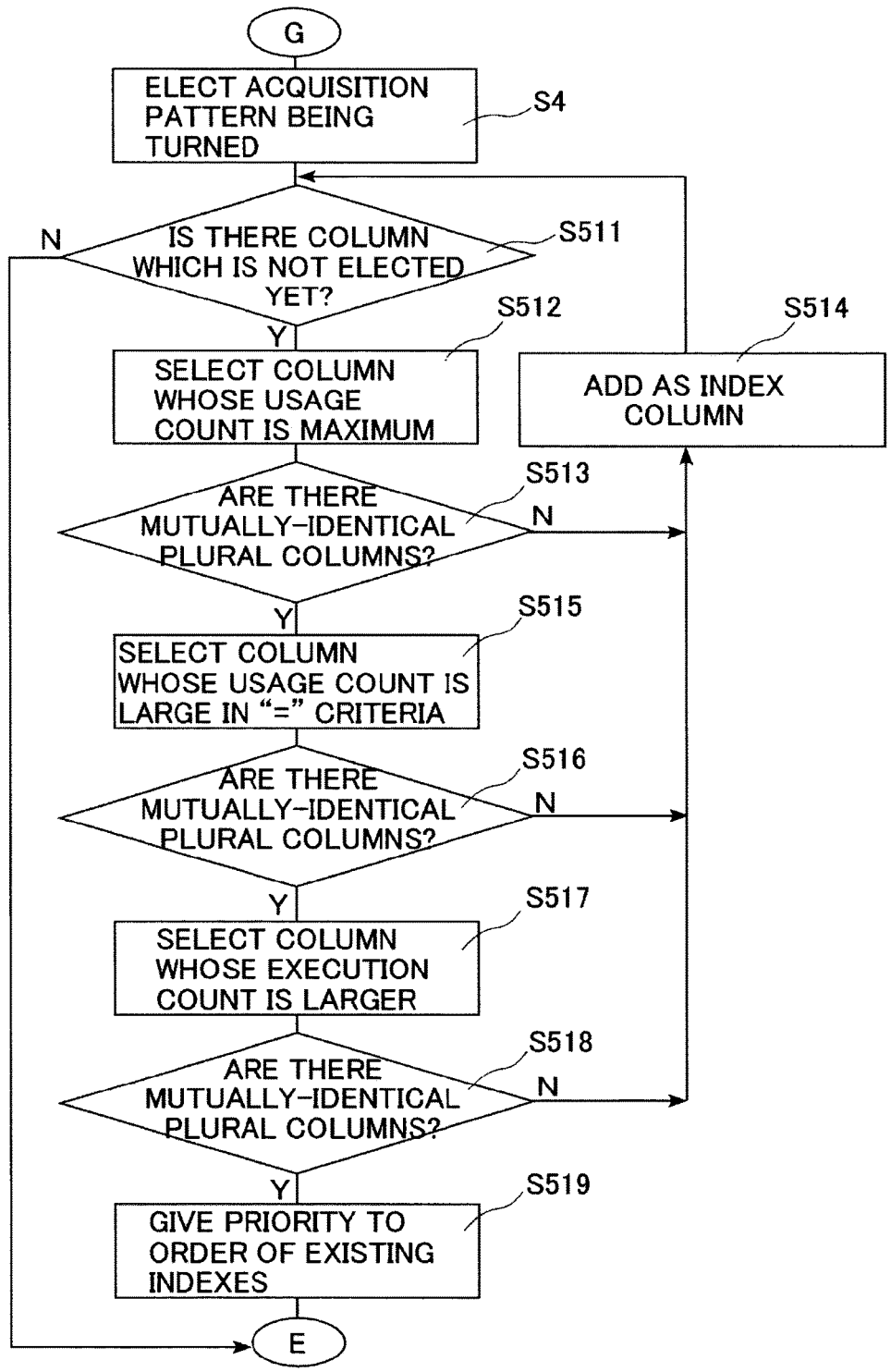
FIG. 4 is a flowchart showing selection of an index for obtaining a first criterion.

A processing flow for the first criterion is shown in FIG. 4. The first criterion is employed to select an optimum index from the search condition information by sequentially narrowing down the usage counts of the columns.

When the acquisition pattern being tuned has been selected (S4), it is then determined whether or not there are columns which are not selected as indexes in the elected acquisition pattern (S511). If there is no column which has not been selected (NO at S511), the selecting process is ended. In contrast, if there are columns which have not been selected (YES at S511), a column of which usage count is maximum is selected (S512).

When there are no plurality of columns which are identical to the selected column (NO at S513), the selected column is added as an index (S514), before proceeding to the step S511 to repeatedly perform the steps continued from the step S511. Meanwhile, when there are a plurality of columns which are identical to the selected column (YES at S513), a column whose usage count is larger under an "=" criteria in operator information of the search condition information (S515). If there are plurality of columns which are identical to the column selected in the foregoing criteria (NO at S516), the selected column is added to the acquisition pattern as an index (S514), and repeats the steps continued from the step S511. In contrast, if the determination shows that there are a plurality of identical columns (YES at S516), a column whose execution count is larger is selected (S517).

Further, when the number of columns which are identical to the elected column is not 2 or more (NO at S518), the selected column is added as an index to the acquisition pattern (S514), and the processes continued from the step S511 are repeated. In contrast, when there are a plurality of columns identical to the selected column (YES at S518), the order of the existing indexes are given a priority, with selecting no indexes (S519).

Meanwhile, a processing flow for the second criterion is shown in FIG. 5. The second criterion is employed to select an optimum index in priority to columns whose execution counts are larger. The second criterion differs from the first criterion lies only in that the process at the step S512 is replaced by a process at step S522, where a column is selected which shows a maximum among totals of amounts calculated by multiplying the usage counts by the execution counts, instead of using the process at step S512 where a column whose usage count is maximum. As described, the step S512 is the first determining criterion for the first criterion. The remaining processing procedures are the same as those for the first criterion (that is, the step S511 for the first criterion and the step S521 for the second criterion are the same in contents, and the steps S513 to S519 for the first criterion and the steps S523 to S529 for the second criterion are the same in contents).

FIG. 6 exemplifies a tuning table T1 generated by the generating unit 14. The composition of this table is just an example, and not intended to limit this exemplified composition.

The tuning table T1 is composed of a table column T11 and columns T111 to T119 which consists of an acquisition pattern and execution record information. The table column T11 shows a list of objects stored in the database main unit D1 and targeted as objects being tuned. In each of the table names, the parenthetic number shows the number summing up as the acquisition patterns SQLs for referring to the table.

In the present embodiment, the top table in the table column T11 shows a "tb 01(47)", which means that the number of acquisition patterns named by the table name "tb01" are 47. Each table has a group of acquisition patterns denoted by the parenthetic number. If a desired table is selected (which is highlighted in FIG. 6), each of the 47 acquisition patterns specified by "tb01" and the execution record information are displayed as a sequence of pieces of tuning information (tuple display). That is, it becomes possible to browse information composed of data displayed by the number column T111, acquisition pattern column T112, evaluated point column T113, the number of SQLs column T114, execution count column T115, lapse time column T116, CPU time column T117, standby time column T118, and the number of blocks column T119. In addition, the acquisition pattern column T112 consists of a search condition information column T112a and a search method information column T112b. The search condition information written in the search condition information column T112a is specified by column data (for example, "TEMPO_CODE" showing a shop code and "YM" and/or "YMD" code showing a date) and operator data (for example, "=", "<" or ">"). Meanwhile the search method information written in the search method information table T112b is specified by index data (for example, "tb01_index01") and scan formula data (for example, "INDEX_RANGE_SCAN"). In the case where the scan method shows the table is scanned throughout with no use of an index, the index data are not displayed, and, instead, the scan method is specified by display of, for example, "tb01_ TABLE_ACCESS_FULL".

The acquisition patterns are obtained by being extracted from the execution plan information of the execution information. FIG. 7 shows execution plan information P specified by the order 1 in the acquisition patterns shown in FIG. 6. A reference numeral P1 indicates an access to the table using a particular scan method selected from given indexes. The particular scan method is capable of pointing out data file, data blocks, and records in the database in a pinpoint manner (ROWID). Hence, by designating this particular scan method in the access, data blocks including target records can be accessed directly, thereby speeding up the search. A reference numeral P2 indicates a given index and scan method (INDEX RANGE SCAN) in the access indicated by P1. Further, a reference numeral P3 indicates data filtering information in the access indicated by P1, and a reference numeral P4 indicates detailed execution information of the information indicated by P2.

Figure 8:
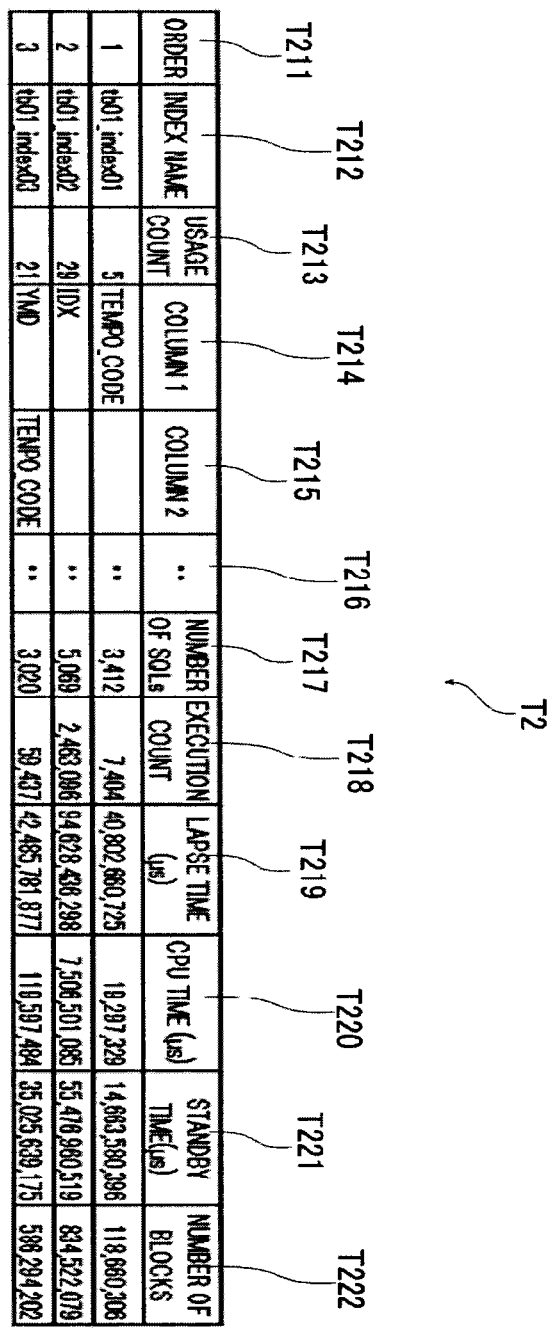
FIG. 8 is a table showing index information about an acquisition pattern of an object being tuned, which composes part of the tuning table shown in FIG. 6.

FIG. 8 shows an index information table T2 which is used by an acquisition pattern targeted to be tuned in FIG. 6 and which constitutes a part of the tuning table. The index information table T2 is composed of a number column T211, index name column T212, index usage count column T213, columns for columns T214 and T215, improved index column T216, the number of SQLs column T217, execution count column T218, lapse time column T219, CPU time column T220, standby time column T221, and the number of blocks column T222.

When making reference to the evaluated points, the first of the number column T111 indicates an evaluated point 33, so that it is determined that there is a room for more improvement. In reply to this determination, this acquisition pattern is elected as an acquisition pattern to be turned, which results in displaying an index information table T2 (refer to FIG. 8) provided by the elected acquisition pattern. An alternative election manner is to set a threshold to the evaluated points such that acquisition patterns whose evaluated points are equal or lower to or than the threshold are automatically elected and corresponding index tables T2 are displayed. An optimum index is selected by tuning, based on the search condition information and the search method information, which are shown in FIG. 6, and the index name and columns current used in FIG. 8. It is further determined whether or not the elected indexes affect other acquisition patterns in FIG. 6, based on the search condition information shown in FIG. 6. With reference to a range affected by the election, the optimum index is finally decided.

The acquisition pattern in the order 1 in FIG. 6, which is specified by the table "TB01", refers to data indicating a particular shop code and a particular date which are as below (as described below, this indication can be understood from usage index detail information P4 and data filtering information P3):

filter(("TB01"."YM"='201007' AND "TB01". "YMD"= TO_CHAR(LAST_DAY(TO_DATE("TB01"."YM"∥'01', 'yyyymmdd')),'yyyymmdd')))

access("TB01"."TEMPO_CODE"='0000001939')

The foregoing acquisition pattern makes reference to only a shop code (TEMPO_CODE) from both the search method information in the order 1 in FIG. 6 and the column information of the indexes in the order 1 in FIG. 8, and selects necessary data. From this, it is understood that reading all data related to a particular shop code is an inefficient action.

In this regard, the improved index column T216 of the index information table T2 shown in FIG. 8 provides first making reference to the search condition information in the order 1 in FIG. 6, and then addition of an index "criterion 1 (YM) (YMD)" as an optimum index column. This addition of "criterion 1 (YM) (YMD)" serving as the optimum index column makes it possible to overcome the inefficiency which results from reading all data of the particular shop code designated by the access pattern in the order 1 in FIG. 6. That is, obtaining the particular date data of a particular shop code improves efficiency in the access.

When referring to the usage count column T213 of the index information table T2 in FIG. 8 while addition of the optimum index column, the identical columns thereto can be found to be used at four places. At the end of this addition process, an optimum index column to be added can be selected in consideration of effect ranges onto such four indexes.

Figure 9:
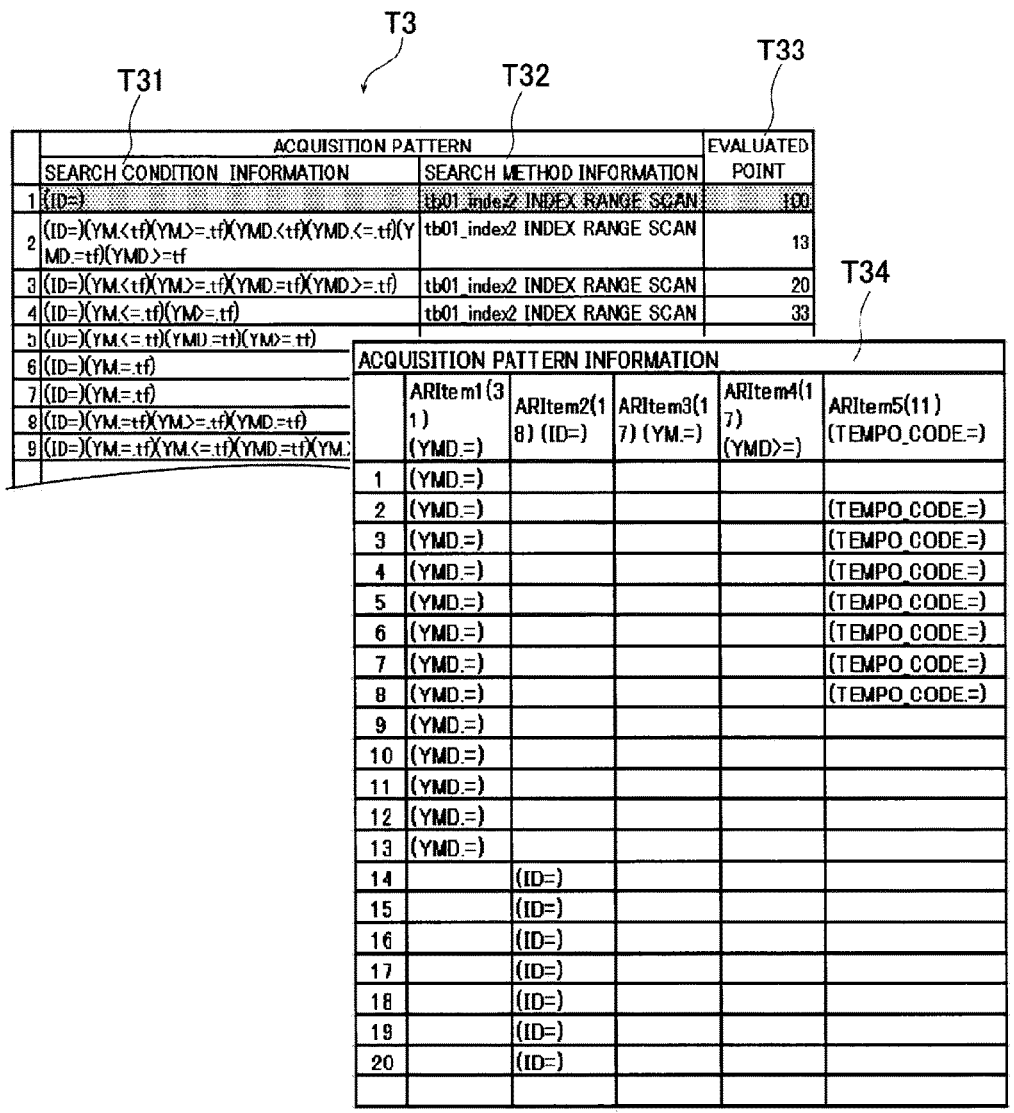
FIG. 9 is a view exemplifying tables generated by sorting column data of acquisition patterns of search condition information in descending order of the number of times of use during a search.

FIG. 9 shows a table T3 produced by sorting out, based on the search condition information of an acquisition pattern, the column data in descending order of the usage count. The same way as FIG. 6, table T3 is composed of a search condition information T31, a search method information T32 and evaluated point T33. In a plurality of stages for testing (for example, unit test, join test, integration test, etc.) carried out in designing object, in the similar way to that shown in FIG. 6, acquiring the execution information and extracting the acquisition patterns are performed in sequence, so that a tuning table for the design is generated. Then the generating unit 14 resolves, every piece of data in columns, search condition information T31 of the extracted acquisition patterns, and, in each of the test stages, generates a table T34 in which the usage counts counted in the search are sorted in descending order thereof. In general, the relational database is on the principle of indexing a column which has been most frequently used. Hence, it can be understood from the table T34 that "YMD" is set as an index column in the top-priority manner.

By the way, in some relational databases, an ID is automatically added to each SQL so as to make it possible to trace the ID such that the ID is subjected to what kinds of access. In such systems, for example, every time when search conditions are changed, a new ID is added. However, in the case of using such added IDs, there are various cases where, for example, SQLs designed by developers are evaluated who desire to trace or identify a searched condition of a given item. In such cases, the trace and evaluation under particular purposes cannot be performed with accuracy.

With consideration of this difficulty, in order to make the foregoing trace more accurate, the tuning apparatus 1 can be designed such that the apparatus 1 also includes an ID adding section which adds fixed IDs to designated SQL groups (not shown in figures). The ID adding section can be delimited by predetermined symbols (normally, diagonals or asterisks), which are seen in instructions to a query optimizer added in one or more command groups issued for predetermined purposes or descriptions of the commands (hereinafter referred to as comments) in SQL sentences, for instance. The fixed IDs can thus be added to texts which are not changed automatically even after execution of the commands. By way of example, a given number of trailing digits of a comment may be set as being recognized as an ID.

Since the command groups in which the foregoing IDs are added are kept without addition of new IDs, as described, the IDs can be used to perform more accurate tracing. In the tuning apparatus 1, when such an ID is searched, the generating unit 14 acts such that execution information in relation to a command group designed by the ID and a table for displaying acquisition patterns are generated. It is therefore possible to perform the trace in a more accurate manner by enabling the generated information to be searched.

During an operation of the relational database in its production environment, there will occur events such as registration of new data or deletion of data and/or changes of definition of data. In such cases, a difference between two tuning tables provided before and after of an occurrence of such an event, that is, an occurrence of new acquisition patterns which are different from the former acquisition patterns are identified and displayed. Of the identified and displayed acquisition patterns, an acquisition pattern whose evaluated point is equal to or less than a predetermined threshold may be subjected to studying an optimum index added thereto (not shown).

In addition, the execution information can be acquired directly from the relational database system D (not shown), instead of acquiring, from dynamic performance views, at intervals, the execution information into the repository installed in the tuning apparatus 1. By adopting this modified configuration, it is possible to simulate a search with the relational database using the selected index data, so that the execution information provided before and after applying the selected index can be browsed. Additionally information about a data distribution can be provided, thereby enabling obtaining tuning results in a direct and speedy manner.

EXAMPLE

A comparison between a work amount provided when the tuning apparatus 1 according to the present invention was operated under a predetermined condition and a work amount provided when the tuning apparatus 1 was not employed and the tuning was performed for each SQL is described below. A work period was 3 months. The relational database had a scale such that the number of SQLs was 1,000,000 and the number of tables was 1, 400, and the relational database was run by technical experts who were ranked at the same level (at least, the technical experts had skills which do not need a previous learning).

TABLE 1

| Work phase | Contents of work | Work amount ||||||  Difference of work amounts |
| --- | --- | --- | --- | --- | --- | --- | --- | --- |
| | | Every SQL ||| Use of tuning apparatus according to the invention ||| |
| | | Man-day | Head-count | Sub-total | Man-day | Head-count | Sub-total | Man-day |
| Environment | Establishment of environment of the present invention apparatus - understanding usage method | 0 | 0 | 0 | 5 | 2 | 10 | −10 |
| Analysis | Extraction of SQL showing longer lapse time routinely, as common process, and application of 11 improved indexes | 11 | 1 | 11 | 4 | 1 | 4 | 7 |
| | Improved indexes are applied to user's request functions. 101 indexes are applied to 8 functions. | 101 | 1 | 101 | 42 | 1 | 42 | 59 |
| Operation and monitoring | Monitoring of SQL execution statistics in transition graph. | 12 | 1 | 12 | 7 | 1 | 7 | 5 |
| | Worst 10 ranks of lapse time on average were confirmed (when improvement is required, the foregoing common process is applied). | 18 | 1 | 18 | 13 | 1 | 13 | 5 |
| | Continuing monitoring of caution-needed SQL used in particular image search | 14 | 1 | 14 | 9 | 1 | 9 | 5 |
| Total | | — | — | 156 | — | — | 85 | 71 |

As clearly shown in Table 1, though a work amount of 10 man-day was necessary to understand how to structure and use the environment of the tuning apparatus 1, all types of work in the actual work phases (i.e., analysis and operation/monitoring) performed using the tuning apparatus 1 could be completed more efficiently than the work with no use of the tuning apparatus 1. Especially, in each functional work in the analysis phase, the former which uses the tuning apparatus 1 was more advantageous than the latter which does not use the tuning apparatus 1 and showed a noted and advantageous difference in the amounts of work.

REFERENCE SIGN LIST

1 tuning apparatus
11 acquiring unit
12 extracting unit
13 calculating unit
14 generating unit
111 estimating unit
141 electing unit
142 selecting unit
A user terminal
D relational database system
D1 database main unit
D2 database management system
T1 tuning table
T2 index information table

What is claimed is:
1. A tuning apparatus which analyzes and improves performance of a relational database, wherein the apparatus comprises:
an acquiring unit that acquires predetermined execution information provided when all commands issued via a predetermined query language to the relational database are executed by a database management system;
an extracting unit that extracts as a pair of acquisition patterns search condition information and search method information for acquiring searched results of data by executing the respective commands; and
a generating unit that generates a tuning table in which the respective executed acquisition patterns are grouped as acquisition pattern groups which are grouped for each of objects of the relational database and each of the acquisition patterns and the acquired execution information corresponding to each of the acquisition patterns are composed as a sequence of tuning information,
wherein the search condition information is specified by both column data for narrowing down a target to be searched and operator data given by describing search condition in relation to the column data in a form of the query language, wherein the search method information is specified by both index data which are set to the column data for narrowing down the target and scan formula data showing a search path which is set to the object, wherein the generating unit comprises an electing unit which identifies, from the acquisition patterns of the respective objects, an acquisition pattern being turned based on the execution information; and a selecting unit which reads, from the elected acquisition pattern, column data which has not been selected as the index data and select the index data from the read column data according to a predetermined condition, and wherein the generating unit incorporates the selected index data into the tuning table.

2. The tuning apparatus of claim 1, wherein the extracting unit extracts, at least, each of the acquisition patterns from execution plan information generated by the database management system.

3. The tuning apparatus of claim 2, wherein the execution information acquired by the acquiring unit includes, in addition to the execution plan information, execution record information consisting of, at least, the number of commands of the query language for making reference to objects targeted to each of the acquisition patterns, an execution count, a lapse time of processing, a usage time of a CPU, and a waiting time of the CPU.

4. The tuning apparatus of claim 1, wherein the acquiring unit acquire the execution information from a virtual table at regular intervals during an operation of the relational database, and manage the acquired execution information in a time sequence, the virtual table being different from the objects actually stored in the relational database and updated at intervals.

5. The tuning apparatus of claim 3, wherein the acquiring unit acquire the execution record information by two types of data acquisition consisting of acquisition of data accumulated from start of an operation of the relational database and acquisition of data within a designated period of time after the start of the operation of the relational database, the data within the designated period of time being obtained by making a predetermined calculating unit calculate the accumulated data acquired.

6. The tuning apparatus of claim 2, wherein the apparatus comprising
a calculating unit that calculates, as a score, an access efficiency of the search method information to the search condition information of each of the acquisition patterns based on a predetermined calculation formula,
wherein the generating unit include information about each of the calculated scores into the execution information.

7. The tuning apparatus of 1, wherein the selecting unit have, at least, two types of selection criteria consisting off a first criterion and a second criterion provided from the execution record information, the first criterion being a preferential selection criterion defined as a usage count of column data which have not been selected, the second criterion, the second criterion being a preferential selection criteria defined as an execution count; and
the generating unit is capable of selecting, from the tuning table, index data selected based on the two types of selection criteria.

8. The tuning apparatus of claim 1, wherein the generating unit displays a number made to correspond to the identified acquisition pattern for display, the number being the number of index data which are the same as index data of the acquisition pattern identified the electing unit and which are set in any of the acquisition pattern groups.

9. The tuning apparatus of claim 1, wherein the apparatus comprises ID adding unit for adding to a text an ID to identify a file, the text describing instructions or a command to a query optimizer added to one or more command groups issued for a specific purpose, the text being not changed automatically even after executing the command,
wherein the generating unit enables the acquisition pattern in the file identified by the added ID, to be browsed.

10. A tuning method which analyzes and improves performance of a relational database, wherein the method includes steps of:
acquiring predetermined execution information provided when all commands issued via a predetermined query language to the relational database are executed by a database management system;
extracting as a pair of acquisition patterns both search condition information and search method information for acquiring searched results of data by executing the respective commands, wherein
the search condition information is specified by both column data for narrowing down a target to be searched and operator data given by describing search condition in relation to the column data in a form of the query language,
the search method information is specified by both index data which are set to the column data for narrowing down the target and scan formula data showing a search path which is set to the object; and
generating a tuning table in which the respective executed acquisition patterns are grouped as acquisition pattern groups which are grouped for each of objects of the relational database and each of the acquisition patterns and the acquired execution information corresponding to each of the acquisition patterns are composed as a sequence of items of tuning information, wherein
the acquisition is performed by acquiring the execution information from a virtual table at regular intervals during an operation of the relational database and stores the acquired execution information in a dedicated repository, and managing the acquired execution information in a time sequence, the virtual table being different from the objects actually stored in the relational database and updated at intervals;
electing which identifies, from the acquisition patterns of the respective objects, an acquisition pattern being turned based on the execution information; and
selecting which reads, from the elected acquisition pattern, column data which has not been selected as the index data and selects the index data from the read column data according to a predetermined condition,
wherein the selected index data are incorporated into the tuning table.

11. The method of claim 10, wherein the method includes a step of calculating, as a score, an access efficiency of the search method information to the search condition information of each of the acquisition patterns based on a predetermined calculation formula,
wherein information about each of the calculated scores is included into the execution information.

12. The tuning method of claim 10, wherein, in a plurality of stages for testing performed in designing the object, performing in sequence acquisition of the execution information and extraction of the acquisition patterns, resolving, every column data, search condition information of the extracted acquisition pattern, and generating, in addition to the tuning table, a table in which the usage count counted in the search is sorted in a descending order thereof.

13. The tuning method of claim 10, wherein, in an operation of the relational database in a production environment thereof, when there occur events including registration of new data, deletion of data, or changes of definition of data, identifying an acquisition pattern newly generated, based on a difference between the two tuning tables provided before and after of an occurrence of any of the events.

14. The tuning method of claim 10, wherein, instead of acquiring the execution information at intervals from the virtual table, directly acquiring the execution information from the relational database, during which search is simulated with the relational database through the selected index data, and a data distribution based on the execution information provided before and after application of the selected index is available for browsing.

* * * * *